March 21, 1933.   H. MUELLER   1,901,923
APPARATUS FOR MANUFACTURING CERAMIC ARTICLES
Filed May 5, 1931   7 Sheets-Sheet 3

Patented Mar. 21, 1933

1,901,923

UNITED STATES PATENT OFFICE

HILMAR MUELLER, OF TRENTON, NEW JERSEY, ASSIGNOR TO THE MUELLER MACHINE COMPANY, OF TRENTON, NEW JERSEY, A CORPORATION OF NEW JERSEY

APPARATUS FOR MANUFACTURING CERAMIC ARTICLES

Application filed May 5, 1931. Serial No. 535,253.

This invention relates to an improved method of, and apparatus for, manufacturing ceramic articles such, for example, as floor tiles and wall tiles, from plastic clay.
The method may appropriately be termed a "plastic method", as distinguished from the "dust process" heretofore extensively employed in the production of floor tiles, wall tiles and the like. In the dust process, the clay, after being mixed either in a ball or a blunger mill and filtered, is dried and then ground into a fine dust containing about 10% moisture. The dust is then pressed into tiles or other such articles. The operation of pressing, even with modern machines, is comparatively slow and costly. The forming dies used in such operation are subjected to great wear and must be frequently replaced. Furthermore, in the grinding of the clay into dust and in the subsequent handling of the material, it is estimated that from 3% to 5% of the material is lost. Also, in the manufacture of the increasingly popular colored tiles or ceramics by the dust process, the air becomes laden with colored clay dust and great damage can ensue from this condition by clay particles of certain dominant colors penetrating into the white or more delicate shades and colors of clay from which articles are being made at the same time.

One of the fundamental purposes of my invention is to provide a method of manufacturing ceramic articles of plastic clay whereby both the loss of material and the difficulties above pointed out with respect to the undesirable mixing of the different colors of clay are eliminated. By virtue of my improved method, a variety of colored, as well as white articles, can be produced side by side without any danger of contamination.

A further and more important object of my invention is the provision of a method of, and apparatus for, manufacturing ceramic articles by which the speed of production may be greatly increased and the cost materially reduced as compared with the results obtained from prior methods and apparatus.

Among the advantages arising from the use of my improved method and apparatus are, first: the elimination of the pulverizing of the clay inasmuch as, with my improvements, the same is used as it comes from the filter press. It is readily understood that pulverizing destroys the clay structure and regardless of how heavy a pressure is afterwards imposed upon it in the production of the articles, it can never regain the integrity and other properties of plastic clay. Secondly, by the use of the same amount of labor, vastly increased production can be obtained by my improved method and apparatus. Thirdly, the tools which operate upon the clay in my improved apparatus are not subjected to any appreciable wear and consequently the tool expense is negligible as compared to the die expenses incident to the use of the dust process. Fourthly, the ceramic articles or tiles made of plastic clay are of finer quality and better appearance, and they may be fired vitreous at a considerably lower temperature than those produced by the dust process and on account of this, not only is a saving effected in the heating medium but also an important saving is effected in the cost of seggars as they will naturally last longer when used under lower temperatures.

More general objects of my invention are the provision of a simple method and a highly efficient apparatus for use in the manufacture of ceramic articles.

Other objects and advantages will appear as I proceed to describe my invention in detail by reference to the accompanying drawings, wherein Fig. 7 is a section through the tile cutting parts of the machine, showing the cutter frame and knives in low position; Fig. 8 is an elevational view, and Fig. 9 a horizontal section, through one of the cam tracks of the press loading frame, the latter view including one of the side plates of the frame.

Figure 4:
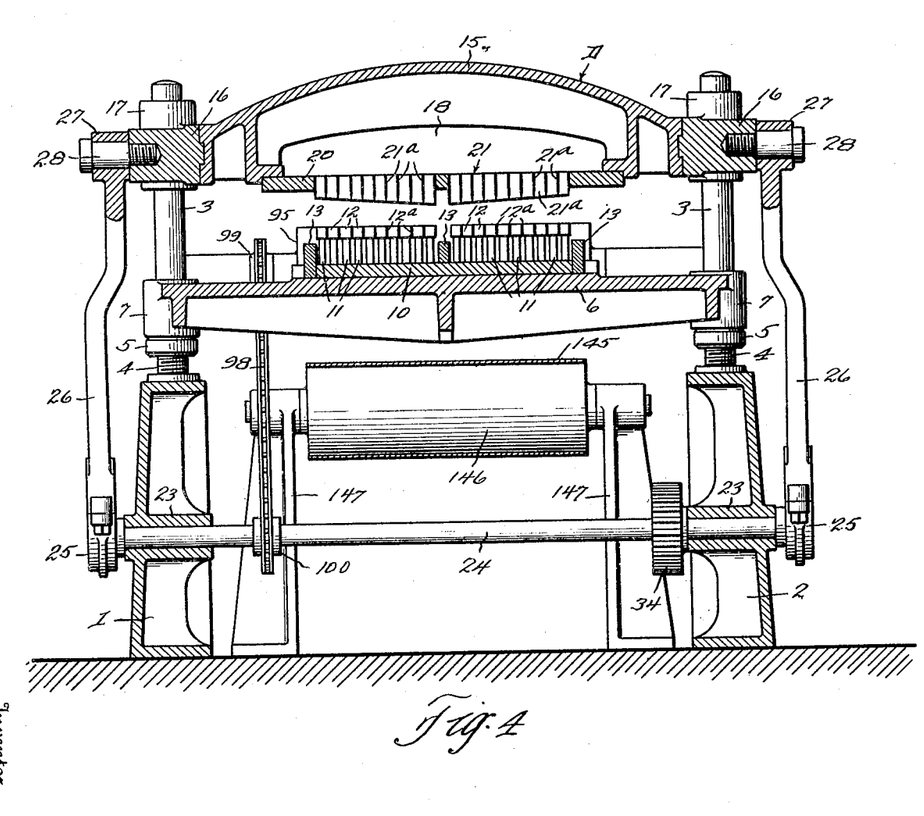

The cutting machine, designated generally by the reference character D, is equipped with a multiple knife or cutter designed to produce rectangular or square tiles, as will hereinafter more fully appear, and it incorporates two substantial housings 1 and 2 from each of which a pair of posts 3 rise, the lower portions of the posts being threaded at 4. Nuts 5 are mounted on the threaded portions of the posts for adjustment therealong, and sustained by these nuts is a table 6. The table is formed with split hollow bosses 7 at its corners that embrace the posts 3 and are locked thereto by bolts 8. By means of the nuts 5, the table may be adjusted to the desired elevation and thereafter secured or clamped in position by the aforesaid bolts. A bed plate 10 is mounted on the table 6, centrally thereof, and a plurality of pins 11 rise from the bed plate and have square heads whose top surfaces are in a common plane. These heads constitute a slotted slab support designated 12. As shown in Fig. 4, the pins 11 are divided into two groups, and disposed between said groups, and at the opposite ends of the bed plate 10, are roof-shaped cutting blocks 13 whose purpose will presently be explained.

The head of the machine is designated 15 and it is supported by and between members 16 having hollow bosses 17 that are guided on the posts 3. For the present purpose, the members 16 may be regarded as parts of the head 15. The central portion of the head is in the form of an arch having an opening designated 18, and suitably secured to the underside of the head and extending across said opening is a cutter frame 20 that carries two multiple cutters or knives 21, the blades 21ª of which are spaced apart and positioned to correspond to the slots 12ª of the slab support 12, so that the blades will enter said slots when the head descends. It will be observed that the top edges of the blades 21ª are flush with the corresponding surface of the cutter frame 20.

Journaled within central bearings 23 of the housings 1 and 2 is a shaft 24 whose ends project beyond said housings and have keyed or otherwise secured to them eccentrics 25. Mounted upon these eccentrics are the lower ends of connecting rods 26 which terminate at their upper ends in bosses 27 that are journaled on studs 28 fixed to the members 16 that constitute the ends of the head 15.

Figure 5:
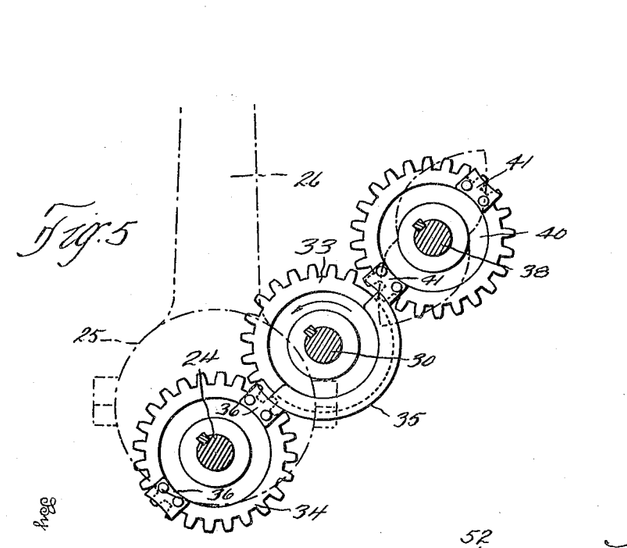
Figs. 5 and 6 are sectional details on the respective lines 5—5 and 6—6 of Fig. 2.
Figure 6:
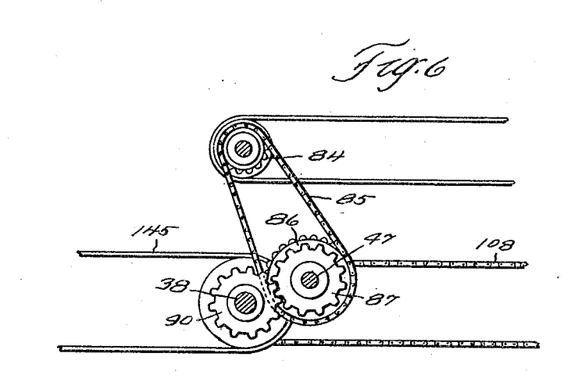

A drive shaft 30 is journaled in bearings 31 of the housings 1 and 2, and power is adapted to be applied thereto from any suitable source through the medium of a chain (not shown) that is engaged over a double sprocket 32 that is suitably secured to the shaft adjacent the housing 1. Fastened to the shaft 30, immediately inside the housing 2, is a mutilated gear 33. This gear cooperates with and intermittently drives a gear 34 that is fastened to the previously mentioned shaft 24. While the toothed portion of the mutilated gear 33 is out of mesh with the teeth of the gear 34, the latter gear is held against movement by the engagement of the track portion 35 of the mutilated gear with one or the other of lugs 36 that are carried by the gear 34, the concave outer surfaces of said lugs 36 being traversed by the track portion of the mutilated gear. A third shaft designated 38 is journaled within bearings 39 of the housings 1 and 2, and suitably secured to this shaft is a gear 40 wherewith the mutilated gear 33 cooperates in the same manner as it cooperates with the previously mentioned gear 34, the gear 40 having lugs 41 for cooperation with the track portion 35 of the mutilated gear. The train of gears involving gears 33, 34 and 40 is shown in detail in Fig. 5, in which view the direction of rotation of the drive shaft 30 is indicated by an arrow. It is evident from the foregoing description that the shafts 24 and 38 will be driven intermittently and alternately, each having imparted to it a half rotation for every complete rotation of the drive shaft 30.

Journaled within bearings 44 of brackets 45 that are secured, as by screws 46, to the front sides of the housings 1 and 2, is a rock shaft 47 to the end of which, beyond the housing 1, is secured an arm 48 equipped with a roller 49 for engagement with a double cam 50 that is fastened to the end of the shaft 38 where it protrudes beyond the bearing 39 of the housing 1. Suitably fastened to the shaft 47 inwardly of the bearings 44 are arms 51 for reciprocating a loading frame that I will now describe.

Figures 8, 9:
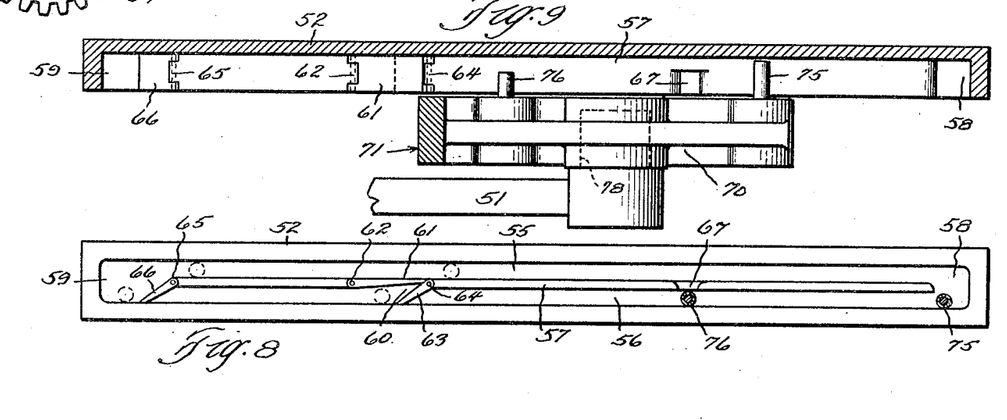

Fastened to the table 6, adjacent each end of the machine, is a cam track or slotted guide 52 whose forward ends are supported from the table by braces 53. As best shown in Figs. 8 and 9, each of these tracks or guides is formed with upper and lower slots 55 and 56, respectively, that are separated by a rail 57 which stops short of the opposite ends of the structure so as to provide passageways 58 and 59 by which the slots 55 and 56 are joined. The rail 57 is interrupted at one point to provide an opening 60 that is normally closed by a bridge 61 that is pivotally supported at 62 in the plane of the rail so that, when in normal position, its top surface is substantially flush with the corresponding surface of the rail. A so-called flap 63 is pivoted at 64 to the rail 57 adjacent the opening 60, and similarly connected at 65 to the end of the rail 57 adjacent the passageway 59 is a flap 66. When these flaps are in normal position, they are inclined downwardly across the lower slot 56 and, if desired, a spring may be employed for holding these flaps, and the bridge 61, in the beforementioned positions. Illustration of this very common expedient is deemed unnecessary. A notch 67 is formed in the rail 57 and, as shown in Fig. 9, the same is of a depth less than the width of the rail.

Reciprocably supported by these cam tracks or slotted guides are the end plates 70 of the previously mentioned loading frame which is generally designated by the reference numeral 71. The rear ends of the plates 70—that is, the ends nearest the slab support 12—are elevated above the plane of said support and are connected together by a cross bar 72 that constitutes the front side of the loading frame. The rear side of the frame is formed of a bar 73 that is rigidly connected to the cross bar 72 by rods 74, the rods being spaced above the plane of the slab support 12 a distance somewhat greater than the thickness of the slabs of clay that are adapted to be handled by the loading frame, as will hereinafter more clearly appear. The lower edges of the bars 72 and 73 are substantially flush with the top surface of the slab support when in normal position. Guide members 75 and 76, which may be pins or rollers, project from the side plates 70 into the slots of the cam tracks or guides 52. The guide member 75 is longer than the one designated 76 so that it will pass the notch 67 in the rail 57 during return movements of the loading frame. Operating within vertical slots 77 of the plates 70 are bosses or rollers 78 on the upper end of the previously mentioned arms 51. It may be explained that the rock shaft 47 is retained in normal position, in which position it is illustrated in the drawings, by a weight 79 on an arm 80 that is secured to the rock shaft at about its longitudinal center. The action of the loading frame will be explained during the description of the operation of the machine.

A drum 82 is rotatably supported by and between bearings 83 that are carried by and projected forwardly from the table 6, and fastened to the same is a sprocket 84 over which a chain 85 is engaged. This chain cooperates with a sprocket 86 which, with a gear 87 that is fastened to it, is rotatably mounted upon the rock shaft 47 between collars 88 and 89. The gear 87 is driven by a gear 90 on the shaft 38. The drum 82 is in line with the slab support 12, and located in substantially the same vertical plane therewith is a drum 91 that is secured to the shaft 38. Also fastened on the shaft 38 adjacent the end of the drum 91 opposite the previously mentioned gear 90, is a sprocket 92. Located on the side of the machine opposite the loading frame 71 is a drum 95 that is rotatably supported by and between brackets 96 that are secured, as by screws 97, to the housings 1 and 2. This drum is driven from the shaft 24 by a chain 98 that is engaged over sprockets 99 and 100, the former being fixed with respect to the drum, while the latter is mounted upon and suitably fastened to the shaft 24.

Situated a suitable distance in front of the machine, and constituting a part of the same apparatus, is a slab feeding unit designated generally by the reference numeral 105. Within the frame of this unit is journaled a shaft 106 on which there is a sprocket 107 of the same size and in line with the sprocket 92 on the shaft 38 of the machine, and a chain 108 is engaged over these sprockets so that the shaft 106 will be driven intermittently and at the same speed as the shaft 38.

Figure 1:
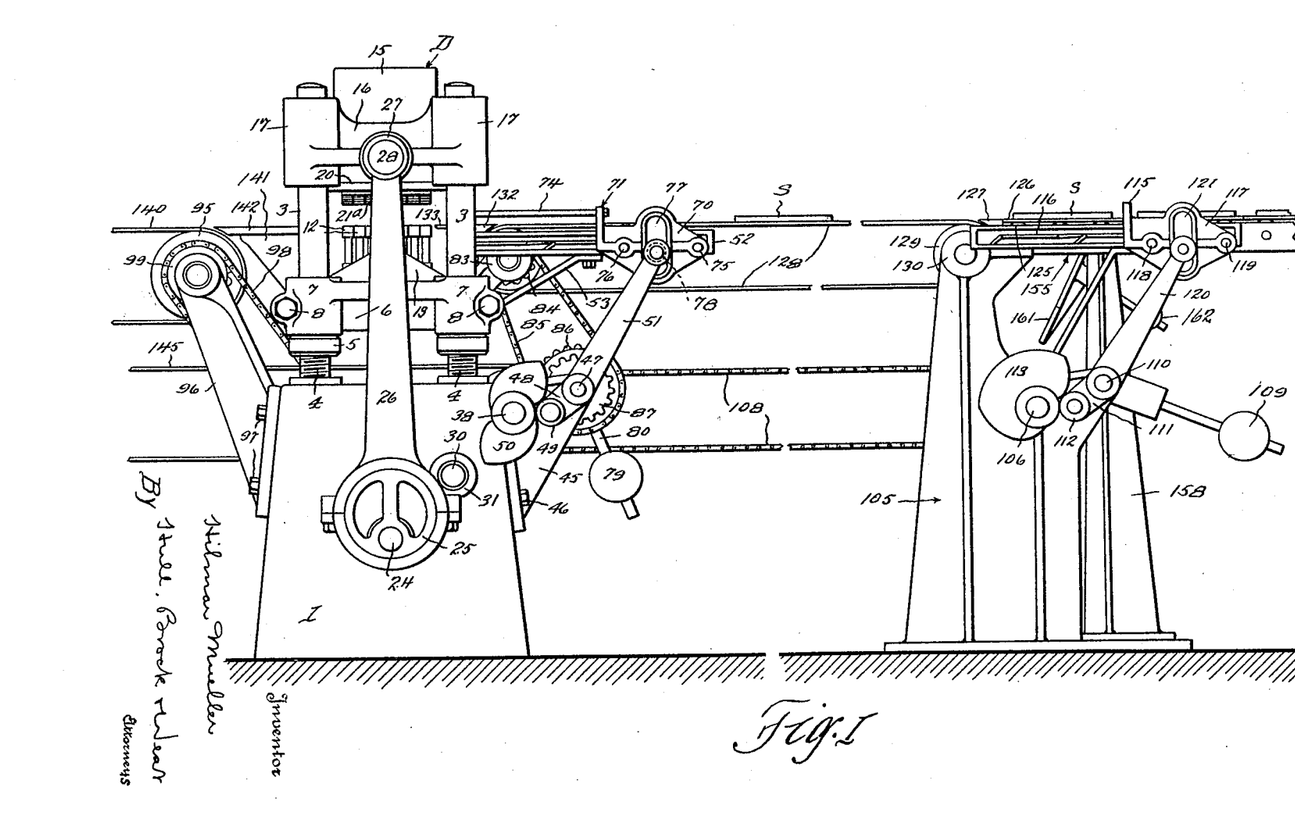
Fig. 1 is a side elevation of a cutting machine constructed in accordance with my invention and employed in the carrying out of my improved method.
Figure 10:
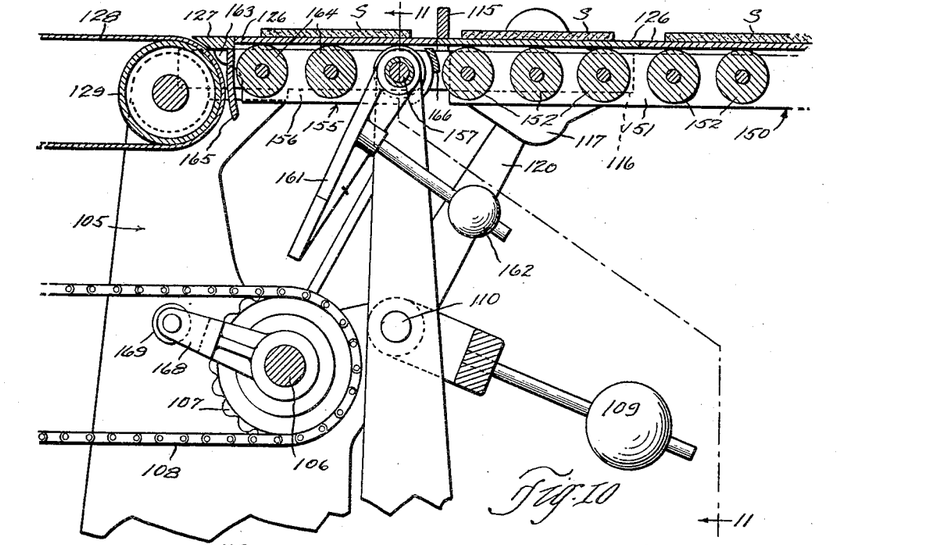
Figs. 10 and 11 are sectional details of the slab feeding unit.
Figure 11:
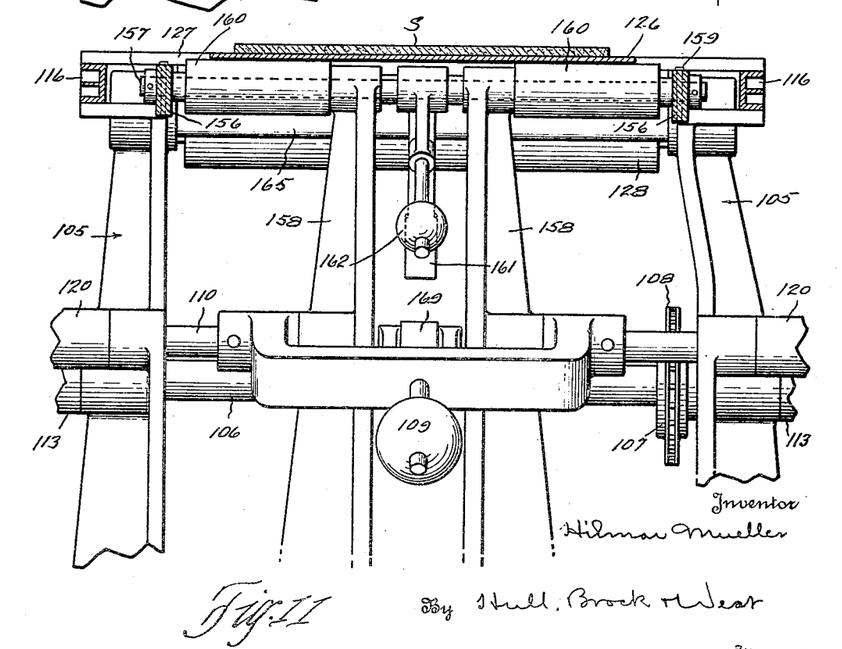

A rock shaft 110 is also journaled in the frame of the unit 105, and to the near end of said shaft, as the parts are viewed in Fig. 1, is secured an arm 111 carrying a roller 112 which engages a cam 113 that is fastened to the adjacent end of the shaft 106. 115 designates a slab feeding bar which is incorporated in mechanism similar to the previously described loading frame 71. Side plates 117, identical with those designated 70, are incorporated in the present mechanism, and they are sustained by guide members 118 and 119 that operate within slots of cam tracks or guides 116, precisely like those designated 52. As will presently appear, the shaft 110 is composed of two sections that are rigidly connected by a yoke equipped with a weight 109 (Figs. 10 and 11). Fastened to the shaft 110 are two arms 120 which cooperate with the opposed side plates 117, the upper end of said arms carrying a stud or roller that operates within slots 121 of the corresponding side plate 117. The cam 113 cooperates with the roller 112 in the same way that the previously mentioned double cam 50 cooperates with the roller 49, but inasmuch as the present cam 113 is single, it will rock the shaft 110 only once to two oscillations of the rock shaft 47.

Figure 12:
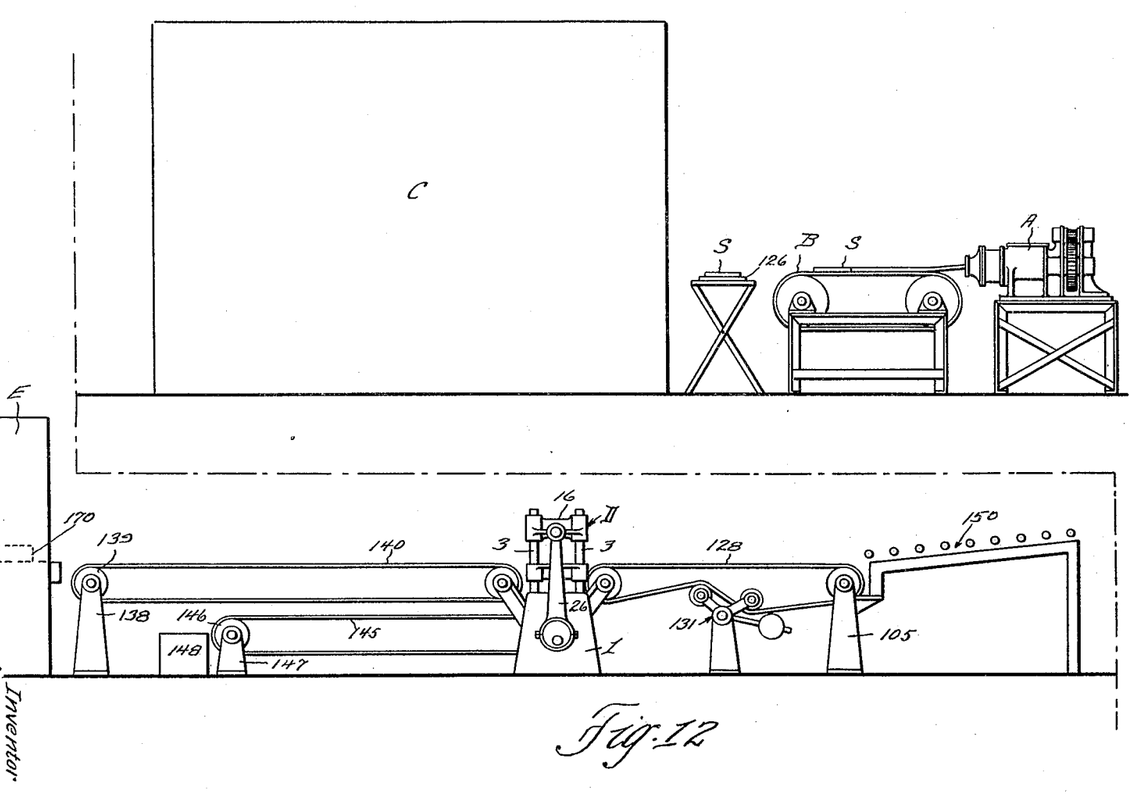
Fig. 12 is a diagram illustrating my improved method.

The unit 105 incorporates a part on which are adapted to be supported pallets 126 that carry the clay slabs S; and flush with the pallet thus supported is a shelf 127 which leads to a slab conveyor 128 that is engaged over the previously mentioned drum 82 of the machine and a drum 129 of corresponding size that is rotatably supported by and between opposed bearings in the frame of the unit 105, the near bearing in Fig. 1 being shown at 130. A take-up for the conveyor is shown in Fig. 12 at 131. Incorporated in the machine, at the end of the slab conveyor 128 opposite the feeding unit 105, is a shelf 132, and the space between the rear edge of this shelf and the front edge of the slab support 12 is bridged by a strip 133 that is hinged at 134 adjacent the shelf 132, the same being sustained in normal position in which its top surface is flush with the corresponding surfaces of the shelf and slab support by one or more springs 135. Thus it will be seen that an even and practically unbroken surface extends from a pallet 126 in the unit 105 to the slab support 12 of the machine.

Figures 1, 3:
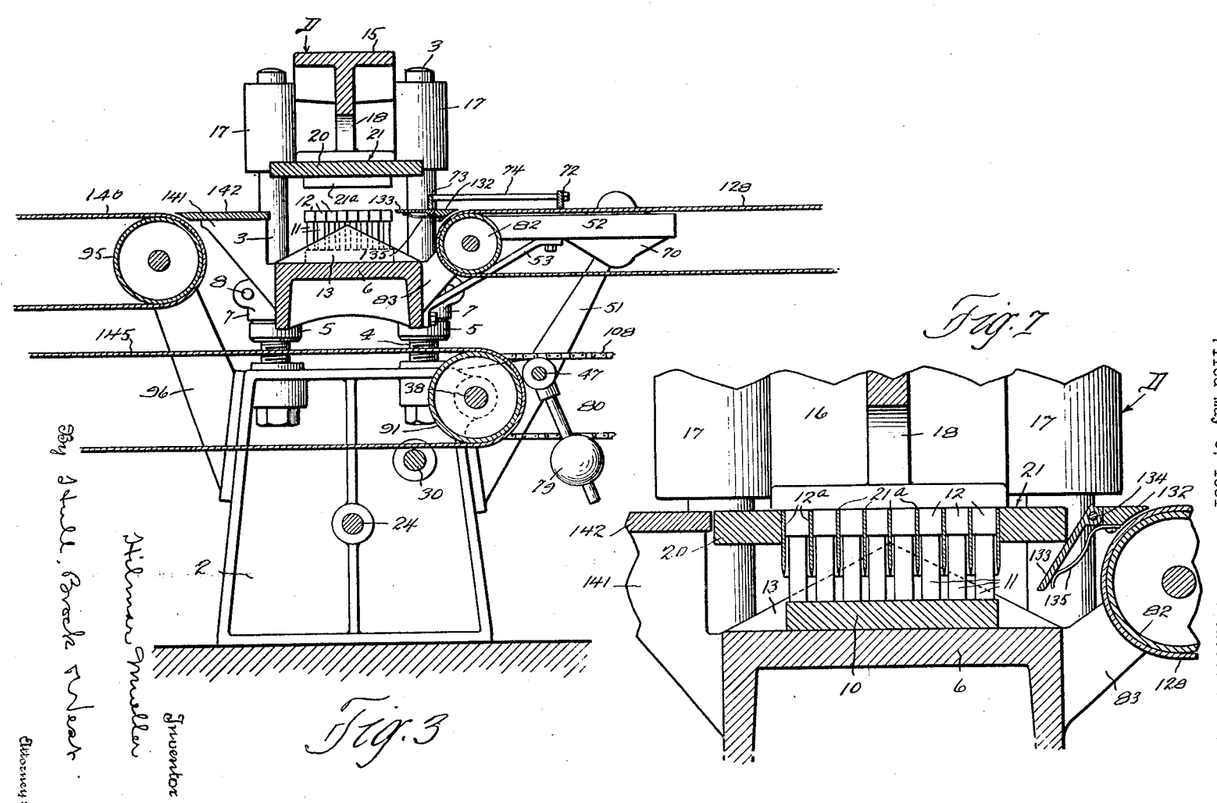
Fig. 3 is a vertical, central, transverse section, and Fig. 4, a similar longitudinal section, through the machine.
Figure 2:
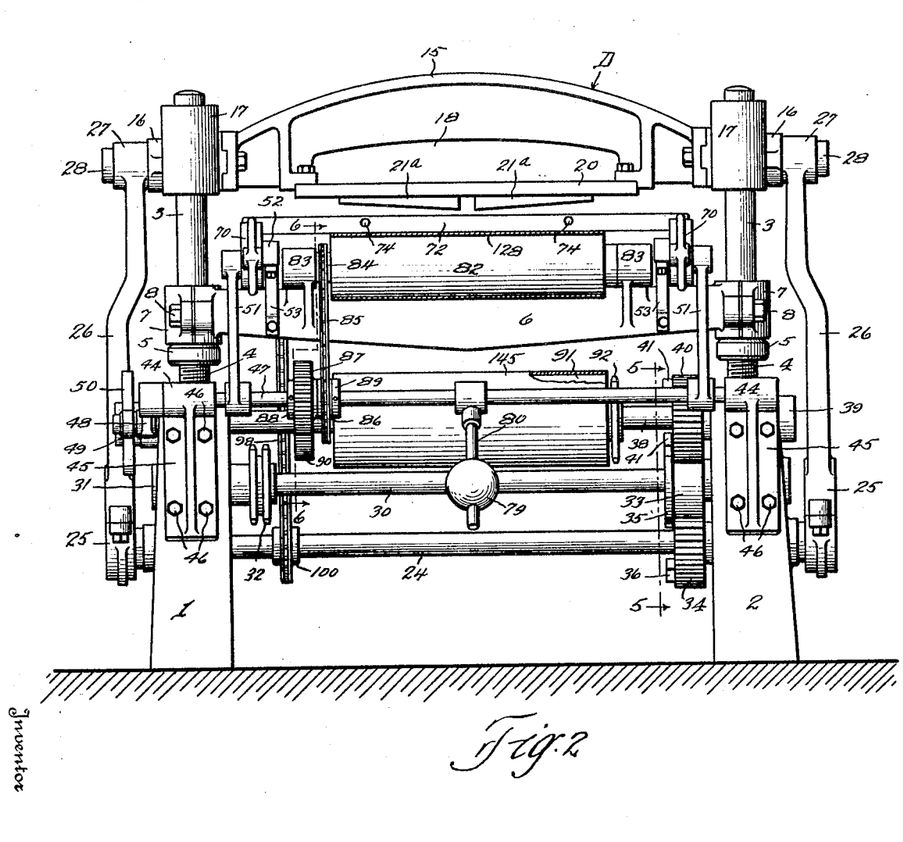
Fig. 2 is a front elevation of the machine.

Rotatably supported by standards 138 (Fig. 12) a suitable distance to the rear of the machine, and at an elevation corresponding to that of the drum 95, is a drum 139 over which, and said drum 95, is engaged a tile conveyor 140. Supported through brackets 141 from the table 6 of the machine is a shelf 142 with its top surface flush with the top surfaces of the conveyor 140 and the slab support 12. As shown best in Fig. 3, the space between the tile support and shelf is substantially equal to the space between the rear edge of the multiple cutter or knife 21 and the rear edge of the cutter frame 20.

A scrap conveyor 145 is engaged over the previously mentioned drum 91 that is carried by the shaft 38, and over a drum 146 of corresponding size that is supported at the same elevation as the drum 91 a suitable distance to the rear of the machine by standards 147. Scrap that is carried away from the machine by the conveyor 145 is discharged into a receptacle 148.

The apparatus thus far described is intended especially for use in my improved method of manufacturing ceramic articles on a quantity production basis; and so as to better adapt it to this purpose I prefer to incorporate in the feeding unit 105, mechanism for automatically discharging the pallets 126 after the slabs S have been removed from the same by means of the feeding bar 115.

This pallet discharging mechanism is shown in detail in Figs. 10 and 11. A gravity conveyor by which the loaded pallets are delivered to the feeding unit is designated generally 150, and the same comprises side rails 151, by and between which rollers 152 are rotatably supported and on which the pallets ride. The conveyor extends in between the cam tracks 116; and constituting a part of the unit 105—or more accurately, a part of the pallet discharging mechanism—is an extension of the gravity conveyor 150, the same being designated generally 155. This extension of the gravity conveyor comprises side rails 156 that are pivotally supported upon a shaft 157 that is journaled in standards 158, the rails being suitably secured against rotation to said shaft as by means of pins 159. Rollers 160 are freely mounted on the shaft 157 between the opposed rails and the standards 158. The standards are spaced apart, and intermediate them an arm 161 is fastened to the shaft, and the same carries a weight 162. This weight, whose influence is transmitted through the arm 161 and the shaft 157 to the rails 156, tends to retain the rails in normal position with stops 163 thereof engaged beneath the shelf 127. Rotatably supported by and between the rails 156 are rollers 164 which, with the previously mentioned rollers 160, constitute a continuation of the series of rollers incorporated in the gravity conveyor 150. Depending from the shelf 127, and flush with its edge remote from the slab conveyor 128, is an arcuate shield 165; and carried by the side rails 156 remote from the shield 165 is a stop 166.

Fastened to the shaft 106 in the plane of the arm 161 is an arm 168 that carries a roller 169. Each time the shaft 106 rotates, the roller 169 engages the arm 161 and swings it in opposition to the influence of the weight 162 thereby to oscillate the shaft 157 and swing the gravity conveyor extension 155 sufficiently to lower the pallet sustained thereby below the shield 165 allowing it to escape beneath said shield and gravitate from the conveyor extension. Suitable means (not shown) may be provided for receiving the discharge pallets. During the downward swinging of the conveyor extension, the stop 166 is elevated into the path of the adjacent pallet on the conveyor 150, thereby preventing the advancement of the pallets thereon until the conveyor extension is returned to normal position.

Assuming that the machine is being driven by power from a suitable source through a chain (not shown) that is engaged over the double sprocket 32, the shaft 30 will be continually rotated and, through the mutilated gear 33, alternately drive the shafts 24 and 38, each having imparted to it a movement of 180° for each complete rotation of the shaft 30. A step-by-step movement is given the slab conveyor 128 by virtue of the driving connections between the drum 82 over which said conveyor is engaged and the shaft 38, effected through the sprocket 84, chain 85, sprocket 86, gear 87 and gear 90, it being remembered that the sprocket 86 and gear 87 are fastened together and are freely rotatable on the shaft 47. In timed relation with the step-by-step movement of the slab conveyor 128, the mechanism of the unit 105 is driven through the chain 108 that is engaged over the sprocket 92 on the shaft 38 and the sprocket 107 on the shaft 106. Each time the shaft 106 rotates, the shaft 110 is oscillated through the medium of the cam 113 and the arm 111 thereby to operate the feeding bar or frame 115. While the feeding bar is advanced, the roller 169 on the arm 168 engages the arm 161 and swings the conveyor extension 155 downwardly thereby to discharge the pallet from which the clay slab has just been removed by said bar, and upon said roller passing beyond the reach of the arm 161 the parts will be returned to normal position under the influence of the weight 162. During the swinging movement of the conveyor extension 155 the stop 166 prevented advancement of the pallets on the conveyor 150 but as soon as the parts resume normal position and said stop is lowered, the pallets on the conveyor are free to advance by gravity and another loaded pallet assumes its position upon the conveyor extension 155. By this time the came 113 has withdrawn from the roller 112 on the arm 111 that is fastened to the shaft 110 allowing said shaft to resume its former position under the influence of the weight 109. This results in a return movement of the arms 120 and during such movement said arms retract the feeding bar or frame 115. During this retraction of said bar or frame, the guides 118 and 119 thereof ride up the flaps of the cam tracks 116 into the upper slots, and the bar 115 is thus elevated during its return movement sufficiently to escape the slab S that rests upon the pallet sustained by the conveyor extension 155. Upon arriving at its normal position at the forward ends of the cam tracks 116, the loading bar drops to the plane of said slab.

During a half rotation of the shaft 38, one part of the double cam 50, through its cooperation with the roller 49, swings the arm 48 thereby to oscillate the shaft 47 to which the said arm is connected; and a rearward and forward movement is imparted, through the arms 51 that are fastened to the shaft 47, to the loading frame 71, which, through the medium of the bar 72, shoves a slab S from the slab conveyor 128 across the shelf 132 and the strip 133 onto the slotted support 12. The slabs are both wider and longer than the support so that a margin of the slab overhangs the support. During its return movement, the feeding frame will be elevated by virtue of the cam tracks 52. As the frame is retracted its guides 75 and 76 ride up the flaps 63 and 66 onto the rails 57 and said guides will remain elevated until they arrive, respectively, at the passageways at the forward ends of the tracks and the notches 67 in the rails 57. Reaching these passageways and slots, the guides 75 and 76 will drop through them and lower the loading frame so that the bars 72 and 73 thereof will drop to slab engaging position. The loading frame will now dwell in normal position while the shaft 38 remains still and the shaft 24 is given a half rotation. The half rotation of the shaft 24 swings the eccentrics 25 downwardly and, through the connecting rods 26, lower the head 15. During the lowering of the head, the multiple cutter 21, carried by the frame 20, cuts the slab sustained by the support 12 into tiles, the blades 21ª of the cutter descending into the slots of the support until their upper edges and the top surface of the cutter frame 20 are substantially flush with the tile sustaining surface of the support, in which position the parts are shown in Fig. 7. As the cutter frame 20 descends, it forces the hinged strip 133 downwardly against the tension of the springs 135, and as it arrives at the bottom of its movement it severs the margin that has been cut from the slab into two parts by contact with the ridges of the cutter blocks 13. These severed marginal portions of the slab slide from the cutter blocks and drop from the table 6 onto the scrap conveyor 145 and are carried by the conveyor 145 to the receptacle 148 (Fig. 12). Now while the cutter is in depressed position and the shaft 24 is still, the shaft 38 is given a half rotation which causes the other part of the double cam 50 to oscillate the shaft 47 to again reciprocate the loading frame 71. During the present excursion of the loading frame, its bar 73 will shove the cut tiles from the support 12 across the top surface of the intervening portion of the frame 20 and across the shelf 142 onto the tile conveyor 140 and, as before, the loading frame will be lifted and returned and then dropped into its normal position. In the meantime, the tile conveyor 128 has been advanced so as to place a slab forwardly of the bar 72 in readiness to be fed onto the tile support during the next cycle of operation. Now, while the shaft 38 remains still, the shaft 24 will be driven to elevate the eccentrics 25 and lift the head 15.

By reference to the diagram of Fig. 12, I will now describe my improved method of producing ceramic articles from plastic clay.

The clay is prepared in the usual way by mixing it in a ball or blunger mill and pumping it to a filter press. After leaving the filter press the clay is placed, according to my method, in an extruding machine designated A from which it is fed in the form of a ribbon of proper width and thickness onto a conveyor B. The clay ribbon as it leaves the extruding machine, contains about 30% moisture. While on the conveyor B the ribbon is cut into slabs S of proper size and these slabs are laid upon pallets 126. The pallets are then placed in a drying oven C where the moisture content of the slabs is reduced to about 15%. The slab-laden pallets are removed from the drying oven and placed upon the gravity conveyor 150 from which they advance to the feeding unit designated 105. From here they are carried at proper intervals as above described by the slab conveyor 128 to the cutting machine D from which they are discharged, as hereinbefore explained, onto the tile conveyor 140. From the conveyor 140 the ceramic articles or tiles are placed in seggars 170 and are transported to the firing oven or kiln E where they are baked at a proper temperature and thus vitrified.

Here I may repeat that plastic made tiles can be fired vitreous at a considerably lower temperature than dust pressed tiles, thus effecting a considerable saving of coal or other heating medium, and in addition to this a considerable saving is effected in the cost of seggars as the same will naturally last longer than when subjected to higher temperatures.

While I have herein disclosed my improved clay cutting machine as equipped with a multiple knife or cutter designed to produce rectangular or square tiles, it is obvious that the same may be provided with cutting equipment for producing all desirable plane geometrical figures, or superficies.

Having thus described my invention, what I claim is:—

1. In a machine of the character described, the combination of a support for material to be cut, a cutter movable through the material to a position beyond the material-sustaining surface of the support, and means for removing the cut material from the support while the cutter is in the aforesaid position.

2. In a machine of the character described, the combination of a support for material to be cut, a cutter movable through the material to a position beyond the material-sustaining surface of the support, means for removing the cut material from the support while the cutter is in the aforesaid position, and driving mechanism for operating the cutter and said means in sequence.

3. In a machine of the character described, the combination of a support for material to be cut, a cutter reciprocable between a normal position in spaced relation to the support and a second position beyond the material-sustaining surface of the support, means for removing cut material from the support, and mechanism for reciprocating the cutter and for operating said means in such timed relation that said means functions while the cutter is in second position.

4. In a machine of the character described, the combination of a support for material to be cut, a cutter reciprocable between a normal position in spaced relation to the support and a second position beyond the material-sustaining surface of the support, means for depositing material on the support, means for removing cut material from the support, and mechanism for reciprocating the cutter, and for operating both said means in such timed relation to the movment of the cutter that the depositing means performs its purpose when the cutter is in normal position and the removing means its purpose when the cutter is in second position.

5. In a machine of the character described, the combination of a support for material to be cut, a cutter reciprocable between a normal position in spaced relation to the support and a second position beyond the material-sustaining surface of the support, a structure reciprocable at substantially right angles to the path of movement of the cutter and incorporating means for depositing material on the support and further means for removing cut material from the support, and mechanism for moving the cutter from normal to second position and, while the cutter is in such position, reciprocating said structure to cause the removing means to function, and thereafter returning the cutter to normal position and reciprocating said structure to cause the depositing means to perform its purpose.

6. In a machine of the character described, the combination of a support for material to be cut, a receiver for cut material whose material-receiving surface is substantially flush with the material-sustaining surface of the support, a cutter frame movable through the plane of the support and having a surface that is substantially flush with the material-sustaining surface of the support when moved as aforesaid, and means for sliding the cut material from the support across an intervening portion of the cutter frame onto the receiver.

7. In a machine of the character described, the combination of a support for material to be cut, a carrier on which material is delivered to a position at one side of the support, a receiver for cut material adjacent the opposite side of the support, a cutter frame reciprocable between a normal position in spaced relation to the support and a second position wherein its rear surface is substantially flush with the support, a structure reciprocable across the support, and mechanism for moving the cutter frame from normal to second position and for reciprocating said structure while the cutter frame is in said second position thereby to remove cut material from the support, the mechanism thereafter functioning to return the cutter frame to normal position and to reciprocate said structure to cause it to slide material from the first mentioned conveyor onto the support.

8. In a machine of the character described, the combination of a support for material to be cut, a conveyor for delivering material to a position at one side of the support, a second conveyor adjacent the opposite side of the support for carrying away cut material, a cutter frame reciprocable between a normal position in spaced relation to the support and a second position wherein its rear surface is substantially flush with the support, and a structure reciprocable across the support and incorporating means for sliding cut material from the support onto the second conveyor and further means for sliding material from the first mentioned conveyor onto the support, and mechanism for moving the cutter frame from normal to second position and for reciprocating said structure while the cutter frame is in said second position thereby to remove cut material from the support by the first mentioned means, the mechanism thereafter functioning to return the cutter frame to normal position and to reciprocate said structure to cause the second mentioned means to slide material from the first conveyor onto the support.

9. In a machine of the character described, the combination of a support for material to be cut, a conveyor for carrying material to a position at one side of the support, a second conveyor adjacent the opposite side of the support for carrying cut material away, a cutter reciprocable between a normal position in spaced relation to the support and an operative position in which its rear surface is in substantially the plane of the support, a structure reciprocable across the support and incorporating spaced apart material engaging bars, driving mechanism for reciprocating the cutter, and mechanism operating in timed relation thereto for reciprocating said structure thereby to cause one of said bars to slide cut material from the support onto the second conveyor when the cutter is in operative position, and for reciprocating said structure when the cutter is in normal position for transferring material from the first mentioned conveyor to the support.

10. In apparatus of the character described, the combination of a support for material to be cut, a conveyor for delivering pieces of material to a position at one side of the support, a second conveyor situated on the opposite side of the support for carrying cut material away, said conveyors being in substantially the plane of the support, a cutter frame reciprocable between a normal position in spaced relation to the support and an operative position in which its rear surface is substantially flush with the material-sustaining surface of the support, a loading frame reciprocable across the support from a normal position over the discharge end of the first mentioned conveyor, said loading frame incorporating spaced bars, one of which serves to slide cut material from the support to the second mentioned conveyor and the other to slide pieces of material from the first mentioned conveyor onto the support, means for lifting said loading frame during its retraction so as to cause it to override material on the first mentioned conveyor, mechanism for feeding pieces of material to the first mentioned conveyor at intervals, and driving mechanism for reciprocating the cutter frame and for reciprocating the loading frame and for operating the feeding mechanism in such timed relation that the cut material is removed from the support when the cutter is in operative position; a piece of material is fed to the support when the cutter is in normal position; and a piece of material is fed to the first mentioned conveyor upon each second reciprocation of the loading frame.

11. In a tile cutting machine, the combination of a slotted, substantially horizontal support, a cutter frame reciprocable between a position above the support and a second position wherein its top surface is substantially flush with the corresponding surface of the support, a multiple blade cutter carried by said frame and whose blades are adapted to enter the slots of the support, a carrier for delivering clay slabs to one side of the support in substantially the plane thereof, a drop leaf between said carrier and support and biased toward normal position in which it is substantially flush with the top surface of the support, a receiver for cut tiles situated on the opposite side of the support in spaced relation thereto, means for reciprocating the cutter frame, a loading frame reciprocable across the support from a normal position over the carrier, said loading frame incorporating a bar for sliding cut tiles from the support onto the receiver, and a second bar for sliding clay slabs from the carrier onto the support, means for reciprocating the loading frame, and driving mechanism for lowering the cutter to second position and reciprocating the loading frame to remove cut tiles from the support while the cutter frame is depressed, and for raising the cutter frame and reciprocating the loading frame while the cutter is in normal position thereby to deliver a slab from the carrier to the support.

12. In a tile cutting machine, the combination of a slotted, substantially horizontal support, a cutter frame reciprocable between a position above the support and a second position wherein its top surface is substantially flush with the corresponding surface of the support, a multiple blade cutter carried by said cutter frame and whose blades are adapted to enter the slots of the support, a carrier for delivering clay slabs to one side of the support in substantially the plane thereof, a drop leaf between said carrier and support and biased toward normal position in which it is substantially flush with the top surface of the latter, a receiver for cut tiles situated on the opposite side of the support in spaced relation thereto, means for reciprocating the cutter frame, a loading frame reciprocable across the support from a normal position over the carrier, said loading frame incorporating a bar for sliding cut tiles from the support onto the receiver, and a second bar for sliding clay slabs from the carrier onto the support, means for reciprocating the loading frame, driving mechanism for lowering the cutter to second position and reciprocating the loading frame to remove cut tiles from the support while the cutter frame is depressed, and for raising the cutter frame and reciproacting the loading frame while the cutter is in normal position thereby to deliver a slab from the carrier to the support, and means for lifting the loading frame during its retraction thereby to cause the second mentioned bar to override clay slabs on the carrier.

13. In a machine of the character described, the combination of a support for material to be cut, a cutter frame receptacle between a normal position in spaced relation to the support and a second position wherein its rear surface is substantially flush with the material-sustaining surface of the support, a loading frame reciprocable across the support and incorporating a bar for removing cut material form the support and a second bar in spaced relation to the first for sliding material onto the support, a carrier on which material is delivered in receiving relation to the loading frame, mechanism for reciprocating the cutter frame and loading frame in a given timed relation, and a cam track for guiding the loading frame in its movements whereby it is advanced in the plane of material on the carrier and support and retracted above the plane of such material.

14. In a machine of the character described, the combination of a table, a head supported for movement toward and from the table, a support for material to be cut sustained by said table, a cutter frame carried by the head for cooperation with said support, a carrier for delivering material to one side of the support, a receiver for cut material at the opposite side of the support, a cam track associated with the carrier, a loading frame cooperating with said track, and mechanism for reciprocating the head and the loading frame in a given timed relation, the cam track serving to guide the loading frame in one plane during its advance movements, and in a higher plane during its return movements.

15. I a machine of the character described, the combination of a housing, a table supported in a horizontal position by said housing, a head slidably supported by the housing above the table for movement toward and from the same, a support for material to be cut mounted on the table, a cutter frame carried by the head for cooperation with said support, a carrier for delivering material to a position at one side of the support, a receiver for cut material situated on the opposite side of the support, a cam track associated with the carrier, a loading frame cooperating with said track and arranged to reciprocate across the support, a drive shaft and two driven shafts rotatably supported by the housing, gearing through which the latter shafts are driven intermittently and alternately from the driving shaft, eccentric means on one of the driven shafts, operative connections between said eccentric means and the head whereby the latter is raised and lowered by successive partial rotations of the eccentric means, cam means on the other driven shaft, operative connections between the same and the loading frame whereby the loading frame is reciprocated during the periods between movements of the head, the cam track serving to support the loading frame in one plane during its advance movements and in an elevated plane during its return movements.

16. In a machine of the character described, the combination of a housing, a table adjustably supported in a horizontal position by said housing, a head slidably supported by the housing above the table for movement toward and from the same, a support for material to be cut mounted on the table, a cutter frame carried by the head for cooperation with said support, a carrier for delivering material to a position at one side of the support, a receiver for cut material on the opposite side of the support, a loading frame arranged to reciprocate across the support, a drive shaft and two driven shafts rotatably supported by the housing, gearing through which the latter shafts are driven intermittently and alternately from the driving shaft, eccentric means on one of the driven shafts, operative connections between said eccentric means and the head whereby the latter is raised and lowered by successive partial rotations of the eccentric means, cam means on the other driven shaft, operative connections between the same and the loading frame whereby the loading frame is reciprocated during the periods between movements of the head, and means serving to support the loading frame in one plane during its advance movements and in an elevated plane during its return movements.

17. In a machine of the character described, the combination of a table, a head supported for movement toward and from the same, a support for material to be cut mounted on the table, a cutter frame carried by the head for cooperation with said support, a carrier for delivering material to a position at one side of the support, a receiver for cut material on the opposite side of the support, a loading frame arranged to reciprocate across the support, a drive shaft and two driven shafts, gearing through which the latter shafts are driven intermittently and alternately from the driving shaft, eccentric means on one of the driven shafts, operative connections between said eccentric means and the head whereby the latter is raised and lowered by successive partial rotations of the eccentric means, cam means on the other driven shaft, operative connections between the same and the loading frame whereby the loading frame is advanced, a weight for retracting the loading frame, the reciprocation of the loading frame occurring during the periods between movements of the head, and means serving to support the loading frame in one plane during its advance movements and in an elevated plane during its return movements.

18. In a clay cutting machine, the combination of a support for a slab of clay, the latter being larger than the support thereby to overhang the same, a cutter frame arranged to cooperate with the support in such manner as to trim off the edge portion of the slab, and cutter blocks adjacent the support and wherewith the cutter frame coacts to sever the trimmed off edge portion into pieces.

19. In a clay cutting machine, the combination of a support for a slab of clay that is of larger area than said support so that the edge portion of the slab overhangs the support, a cutter frame cooperating with the support to trim off the edge of the slab, and a cutter block adjacent the support and having a ridge from which the surface of the block recedes, the cutter frame cooperating with the cutter block to sever the trimmed off edge portion of the slab into parts which are directed away by the receding surface of the cutter block.

20. In a clay cutting machine, the combination of a support for a slab of clay that is larger in area than said support and which is adapted to overhang the support on different sides, a cutter frame cooperating with the support for trimming off the overhanging portions of the slab, and cutter blocks adjacent the support wherewith the cutter frame cooperates to sever the trimmed off portions of the slab.

21. In a clay cutting machine, the combination of a support for a slab of clay that is greater in area than said support and overhangs the support on all sides, a cutter frame cooperating with the support to trim off the margin of the slab, and roof-shaped cutter blocks disposed adjacent opposite sides of the support and with the ridges of which the cutter frame cooperates to sever the trimmed off marginal portion of the slab.

22. In a clay cutting machine, the combination of a slotted support for a clay slab that is greater in area than said support so as to overhang the same on all sides, a cutter frame equipped with multiple blade cutters for cooperation with the support, the cutter frame passing about the sides of the support while the blades enter the slots thereof, and cutter blocks adjacent opposed sides of the support and wherewith the cutter frame cooperates to sever the trimmed off marginal portion of the slab into pieces.

23. In apparatus of the character described including a slab conveyor, mechanism for feeding clay slabs to said conveyor comprising in combination, a support for sustaining a slab carrying pallet with the surface thereof in substantially the plane of the slab receiving surface of the conveyor, means for delivering slab laden pallets to the support and removing empty pallets therefrom, a feeding frame reciprocable across said support for shoving slabs from the pallets to the conveyor, mechanism for reciprocating the feeding frame, and means for lifting the feeding frame during its return movements.

24. In apparatus of the character described including a slab conveyor, a feeding mechanism comprising, in combination, a support for sustaining slab laden pallets substantially flush with the slot receiving surface of the conveyor, a cam track adjacent said support, a feeding frame cooperating with said track and including a bar for engaging the slab on a pallet and shoving it onto the conveyor when the feeding frame is advanced, means for reciprocating the frame, said cam track serving to lift the frame during its return movement, and means for conveying slab laden pallets to the support in the direction of movement of the feeding frame.

25. In apparatus of the character described involving a slab feeding conveyor, feeding mechanism comprising, in combination, a movable support for sustaining a slab laden pallet with its slab supporting surface substantially flush with the slab receiving surface of the conveyor, a loading frame reciprocable across the support for sliding slabs from the pallets onto the conveyor, means for reciprocating the feeding frame, and mechanism for moving the support in a given timed relation to the reciprocation of the feeding frame thereby to discharge empty pallets from the support.

26. In apparatus of the character described involving a belt conveyor, feeding mechanism comprising, in combination, a gravity conveyor in line with the belt conveyor and having its discharge end spaced therefrom, a support constituting an extension of the gravity conveyor for bridging the gap between it and the belt conveyor, the gravity conveyor being arranged to deliver slab laden pallets to the support while the latter is arranged to sustain a pallet with its top surface in substantially the plane of the corresponding surface of the belt conveyor, a feeding frame reciprocable across the support and involving a bar that is arranged to slide a slab from a pallet sustained by the support onto the belt conveyor during the advance movement of the feeding frame, means for reciprocating the feeding frame, means for lifting the feeding frame during its return movement, and mechanism for swinging the support downwardly between reciprocations of said feeding frame thereby to discharge empty pallets.

27. In a machine of the character described, slab shifting mechanism comprising, in combination, a support for slabs, a cam track sustained adjacent said support, a slab moving frame cooperating with said track, and mechanism for reciprocating the frame, the cam track serving to guide the frame in one plane during its advance movements and in a higher plane during its return movements.

In testimony whereof, I hereunto affix my signature.

HILMAR MUELLER.